(12) United States Patent
Bard et al.

(10) Patent No.: US 11,279,108 B2
(45) Date of Patent: Mar. 22, 2022

(54) GLAZING HAVING A FRAME FOR AN INFORMATION ACQUISITION SYSTEM

(71) Applicant: CENTRAL GLASS COMPANY, LIMITED, Ube (JP)

(72) Inventors: Michael Bard, Primm Springs, TN (US); Katharina Boguslawski, Trier (DE)

(73) Assignee: CENTRAL GLASS COMPANY, LIMITED, Ube (JP)

( * ) Notice: Subject to any disclaimer, the term of this patent is extended or adjusted under 35 U.S.C. 154(b) by 59 days.

(21) Appl. No.: 16/962,074

(22) PCT Filed: Jan. 23, 2019

(86) PCT No.: PCT/US2019/014654
§ 371 (c)(1),
(2) Date: Jul. 14, 2020

(87) PCT Pub. No.: WO2019/147605
PCT Pub. Date: Aug. 1, 2019

(65) Prior Publication Data
US 2020/0391577 A1 Dec. 17, 2020

Related U.S. Application Data

(60) Provisional application No. 62/621,286, filed on Jan. 24, 2018.

(51) Int. Cl.
*B32B 3/02* (2006.01)
*B32B 1/00* (2006.01)
(Continued)

(52) U.S. Cl.
CPC .......... *B32B 1/00* (2013.01); *B32B 17/10036* (2013.01); *B32B 17/10174* (2013.01);
(Continued)

(58) Field of Classification Search
CPC ........ B32B 17/10036; B32B 17/10348; B32B 17/10256; B32B 17/10266; B32B 17/10293; B32B 17/10357
See application file for complete search history.

(56) References Cited

U.S. PATENT DOCUMENTS 10,773,496 B2 * 9/2020 Aoki ........................ B32B 3/02
2006/0250711 A1 11/2006 Noguchi et al.
(Continued)

FOREIGN PATENT DOCUMENTS

| EP | 3434472 A1 | 1/2019 |
|---|---|---|
| WO | 2015/186839 A1 | 12/2015 |
| WO | 2019/158855 A1 | 8/2019 |

OTHER PUBLICATIONS

Extended European Search Report for European patent application No. 19743527.4, dated Dec. 21, 2020 by European Patent Office, 8 pages.
(Continued)

*Primary Examiner* — Elizabeth E Mulvaney
(74) *Attorney, Agent, or Firm* — Bass, Berry & Sims, PLC; Shu Chen

(57) ABSTRACT

The present disclosure generally relates to a vehicle glazing (e.g., vehicle windshield) having an opaque enamel printed opening for an information acquisition system and a darkening source within the opaque enamel printed opening to reduce optical transmittance distortion and improve performance of information acquisition systems (e.g., an imaging system, electric sensor(s), video camera(s), distance sensor (s)) associated with a vehicle. The darkening source, which may not undergo extreme heat treatment above 500 deg. C., provides a darkening source open area within the opaque enamel print open area, wherein the darkening source open area provides an opening through which the information
(Continued)

acquisition system may receive information from outside a vehicle.

20 Claims, 15 Drawing Sheets

(51) Int. Cl.
  *B32B 17/10* (2006.01)
  *B60J 1/00* (2006.01)
  *B60J 1/02* (2006.01)
  *B60R 11/04* (2006.01)
  *B60R 11/00* (2006.01)

(52) U.S. Cl.
  CPC .. *B32B 17/10183* (2013.01); *B32B 17/10266* (2013.01); *B32B 17/10293* (2013.01); *B32B 17/10348* (2013.01); *B32B 17/10357* (2013.01); *B32B 17/10761* (2013.01); *B32B 17/10889* (2013.01); *B60J 1/001* (2013.01); *B60J 1/02* (2013.01); *B32B 2605/006* (2013.01); *B60R 11/04* (2013.01); *B60R 2011/0026* (2013.01)

(56) References Cited

U.S. PATENT DOCUMENTS

| | | |
|---|---|---|
| 2011/0027515 A1 | 2/2011 | Melcher et al. |
| 2016/0243796 A1 | 8/2016 | Mannheim Astete et al. |
| 2017/0015180 A1 | 1/2017 | Sakamoto et al. |
| 2017/0232713 A1 | 8/2017 | Mannheim Astete et al. |
| 2017/0274629 A1* | 9/2017 | Yajima .............. B32B 17/10761 |
| 2019/0337270 A1* | 11/2019 | Sadakane ........... G02B 27/0101 |
| 2020/0398536 A1* | 12/2020 | Wohlfeil ............... B32B 38/145 |
| 2021/0031597 A1* | 2/2021 | Sauvinet ........... B32B 17/10036 |

OTHER PUBLICATIONS

International Search Report and the Written Opinion for International application No. PCT/US2019/014654, filed Jan. 23, 2019, dated Mar. 14, 2019 by International Searching Authority, 12 pages.

* cited by examiner

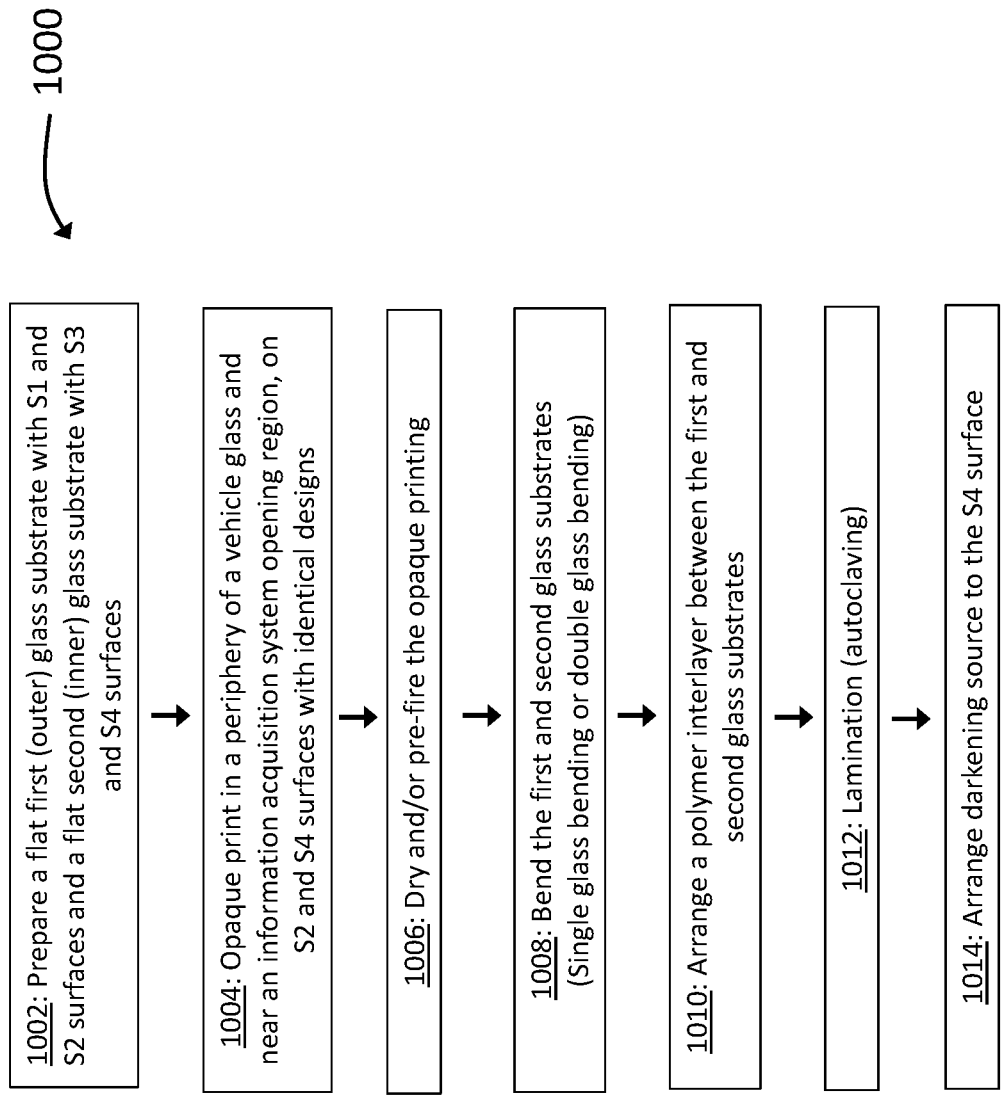

GLAZING HAVING A FRAME FOR AN INFORMATION ACQUISITION SYSTEM

CROSS REFERENCE TO RELATED APPLICATION

This application is a national stage of PCT International Application No. PCT/US2019/014654, tiled Jan. 23. 2019, and claims priority to U.S. Provisional Patent Application No. 62/621,286 filed on Jan. 24, 2018, entitled "LAMINATED VEHICLE WLNDOW HAVING AN OPAQUE STICKER FRAME FOR INFORMATION ACQUISITION SYSTEM," the content of which is incorporated by reference herein in its entirety.

TECHNICAL FIELDS

The present disclosure generally relates to a vehicle glazing (e.g., vehicle windshield) having an opaque enamel printed opening for an information acquisition system and a darkening source within the opaque enamel printed opening to reduce optical transmittance distortion and improve performance of information acquisition systems (e.g., an imaging system, electric sensor(s), video camera(s), distance sensor(s)) associated with a vehicle.

BACKGROUND

Information acquisition systems mounted inside a vehicle are increasingly popular for improving safety performance and/or comfort during, e.g., an auto-driving mode of a vehicle. This type of system may include imaging systems, anti-collision systems, brake assisting systems, driving assistance systems and/or auto-driving systems using various electric sensors and/or cameras.

The electronic sensors or cameras in information acquisition systems are typically mounted directly on an inner surface of a vehicle glazing or positioned near a vehicle glazing. The sensors or cameras may collect information on conditions outside of a vehicle by, for example, emitting and/or detecting infrared rays, near infrared rays, laser radar and/or visible light through a glazing, which may be laminated or a single glass substrate.

To hide the electronic sensors or cameras from view when outside of a vehicle, an opaque enamel layer (e.g., dark or black colored enamel printing) may be printed on an inner surface S2 of an outer glass (first glass) substrate or on an outer surface S4 of an inner glass (second glass) substrate. The opaque enamel print may be applied to mask such a system and provide an opaque enamel print open area through which the information acquisition system collects information, in addition to an opaque enamel printing region periphery of the laminated vehicle windshield.

For purposes of this disclosure, including with reference to the figures, a first glass substrate includes surfaces S1 and S2 and a second glass substrate includes surfaces S3 and S4. A surface S1 of an outer glass (first glass) substrate faces a vehicle exterior, a surface S2 of the outer glass substrate is opposite the S1 surface, S2 and S3 surfaces are inside the laminated vehicle glazing, and a S4 surface of an inner glass substrate faces a vehicle interior and is opposite the S3 surface.

There are several examples of a laminated vehicle windshield having information acquisition system opening region(s). For example, U.S. Patent Application Publication No. 2011/0027515 A1 generally discloses an opening arrangement in a laminated vehicle windshield for an electric detector mounted in the inner side of the windshield. Moreover, U.S. Patent Application Publication No. 2017/0015180 A1 generally discloses an opaque masking layer and opening for an information acquisition device.

SUMMARY OF DISCLOSURE

Embodiments disclosed herein include an automotive glazing, comprising at least one glass substrate; an opaque print on the at least one glass substrate, wherein the opaque print provides a first open area for an information acquisition system, wherein the first open area is larger than a required opening for the information acquisition system, wherein the first open area is larger than a required opening for the information acquisition system, wherein the automotive glazing comprises a first distortion within the first open area; and a second open area within the first open area, wherein the second open area is at least as large as the required opening for the information acquisition system, and wherein the automotive glazing comprises a second distortion within the second open area, wherein the second distortion is less than the first distortion.

Further disclosed herein is an automotive laminated glazing, comprising a first glass substrate having at least surfaces S1 and S2, wherein S1 faces a vehicle exterior; a second glass substrate having at least surfaces S3 and S4, wherein S4 faces a vehicle interior; a first interlayer between the first and second glass substrates; an opaque print providing at least one first open area for a first information acquisition system, wherein the first open area is larger than a first required opening for the first information acquisition system; and a first darkening source at least partially within the first open area, wherein the first darkening source provides a second open area within the first open area, wherein the first required opening fits within the second open area, wherein the first darkening source does not undergo heat treatment greater than 500° C., and wherein the first open area is larger than the second open area in square mm.

In some embodiments, the average visible light transmittance across the entire first open area is less than 70% and the average visible light transmittance across the entire second open area is at least 70% or more. In certain embodiments, the first darkening source has a visible light transmittance of less than or equal to 10%, less than or equal to 6%, or less than or equal to 3%.

The first darkening source may include a print. The print may be on at least one of the first glass substrate and the second glass substrate. In some embodiments, the print is on at least one of the S2, S3, and S4 surfaces. In further embodiments, the print may be on the first interlayer.

In certain embodiments, the first darkening source may be a substrate. The substrate may be a printed surface. In some embodiments, the substrate is a polymer film, wherein the polymer film may be located between the first glass substrate and the first interlayer. In further embodiments, the polymer film may be located between the second glass substrate and the first interlayer. In further embodiments, the polymer film is sandwiched between the first interlayer and a second interlayer. The polymer film may comprise an adhesive layer. In some embodiments, the polymer film having an adhesive layer may be adjacent to at least one of the S2, S3, and S4 surfaces. In further embodiments, the polymer film may include an electrical component, which may be on surface S4.

In some embodiments, the first darkening source is a coating. The coating may be on at least one of the S2, S3, and S4 surfaces.

The first darkening source may comprise a colored interlayer in some embodiments. In further embodiments, a portion of the first interlayer may be removed and replaced with the colored interlayer.

Further, the first darkening source may be an obscuration on surface S4. The obscuration may be a mounting device for attaching an object to the automotive laminated glazing. The mounting device may be a bracket for holding the information acquisition system. In further embodiments, the obscuration may be a mating device located between the automotive laminated glazing and another object.

In certain embodiments, the first darkening source may completely surround the second opening area. In further embodiments, the first darkening source does not surround the entire second open area. Where the second open area has at least three sides, the first darkening source may be on at least one side of the second open area.

In further embodiments may include a second information acquisition system, wherein the second information acquisition system has a second required opening, wherein the opaque print further comprises a third open area, separate from the first open area, such that the third open area is larger than the second required opening of the second information acquisition system; and a second darkening source, wherein the second darkening source is located at least partially within the third open area, wherein the second darkening source provides a fourth open area within the third open area, wherein the second required opening fits within the fourth open area. The first information acquisition system and the second information acquisition system may be integrated together in a single system. In certain embodiments, the first darkening source and the second darkening source are a single structure.

Certain embodiments may further comprise a second information acquisition system having a second required opening, wherein the first darkening structure further provides a third open area within the first open area, wherein the second required opening fits within the third open area.

Each edge of the second open area may be equidistant from each corresponding edge of the first open area in some embodiments. In further embodiments, the distance between a first edge of the second open area and a corresponding first edge of the first open area is different from the distance between a second edge of the second open area and a corresponding second edge of the first open area. In some embodiments, the first open area and the second open area share at least one edge.

In some embodiments, the opaque print is on surface S2. There may also be a second opaque print on surface S4. The second opaque print may comprise a third open area, which may be identical in shape and size to the first open area, wherein the third open area and the first open area are aligned in the automotive laminated glazing.

In certain embodiments, an edge of the first open area is from 2 mm to 22 mm, 2 mm to 10 mm, or 2 mm to 6 mm from an edge of the second open area. Some embodiments include a first darkening source that is the same color as the opaque print. The first darkening source may be adjacent to the opaque print in some embodiments.

Further disclosed herein is an automotive glazing comprising a glass substrate having surfaces S1 and S2, wherein S1 faces a vehicle exterior, an opaque print providing at least one first open area for an information acquisition system, wherein the first open area is larger than a required opening for the information acquisition system; and a darkening source at least partially within the first open area, wherein the darkening source provides a second open area within the first open area, wherein the required opening for the information acquisition system fits within the second open area.

In certain embodiments, the average visible light transmittance across the entire first open area is less than 70% and the average visible light transmittance across the entire second open area is at least 70% or more.

Further disclosed herein is a method of preparing a laminated glazing comprising providing a first glass substrate having surfaces S1 and S2; providing a second glass substrate having surfaces S3 and S4; printing an opaque print on at least one surface of the first or second glass substrates, wherein the opaque print comprises at least one first open area for an information acquisition system, wherein the first open area is larger than a required opening for the information acquisition system; providing a darkening source, wherein the darkening source provides a second open area, wherein the required opening for the information acquisition system fits within the second open area; providing at least one interlayer between the first glass substrate and the second glass substrate; and laminating the first and second glass substrates together with the interlayer therebetween such that second open area is within the first open area.

In some embodiments, an edge of the first open area is from 2 mm to 22 mm, 2 mm to 10 mm, or 2 mm to 6 mm from the edge of the second open area the darkening source may be provided after lamination. In further embodiments, the darkening source may be provided before lamination.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 10 illustrates yet another manufacturing process of a laminated vehicle glazing having a darkening source, according to an exemplary aspect of the present disclosure.

DETAILED DESCRIPTION

In the following description, for purposes of explanation, specific details are set forth to promote a thorough understanding of one or more aspects of the disclosure. It may be evident in some or all instances, however, that many aspects described below can be practiced without adopting the specific design details described below.

The disclosure is directed to an improved performance information acquisition system opening in a vehicle glazing having an opaque enamel printing and a darkening source for allowing an information acquisition system to effectively observe and collect information from a vehicle exterior.

Optical distortion may be defined as an inverse of focal length of the convex/concave lens, typically presented in milli-diopter (mdpt), which may be positive or negative in value. As used herein, optical distortion is presented as absolute values, such that less optical distortion refers to values approaching zero. Optical power of horizontal optical distortion in a windshield may be measured by using ISRA Labscan-Screen 2D inspection equipment. Particularly, optical filter settings may be 3/2/0, corresponding to a physical length of 2 mm and masking filter settings may be 6/5/5/R_, which masks a physical length of approximately 9 mm around the opaque black print in the opening at an installation angle of about 60.6 degrees. The masking must be applied as the inspection algorithm shows mathematical artefacts when calculating the values close to non-transparent areas. These artefacts are not a physical nature of the glass and may be hidden by the mask so that they are not confused with the optical power of the glass.

Figure 1:
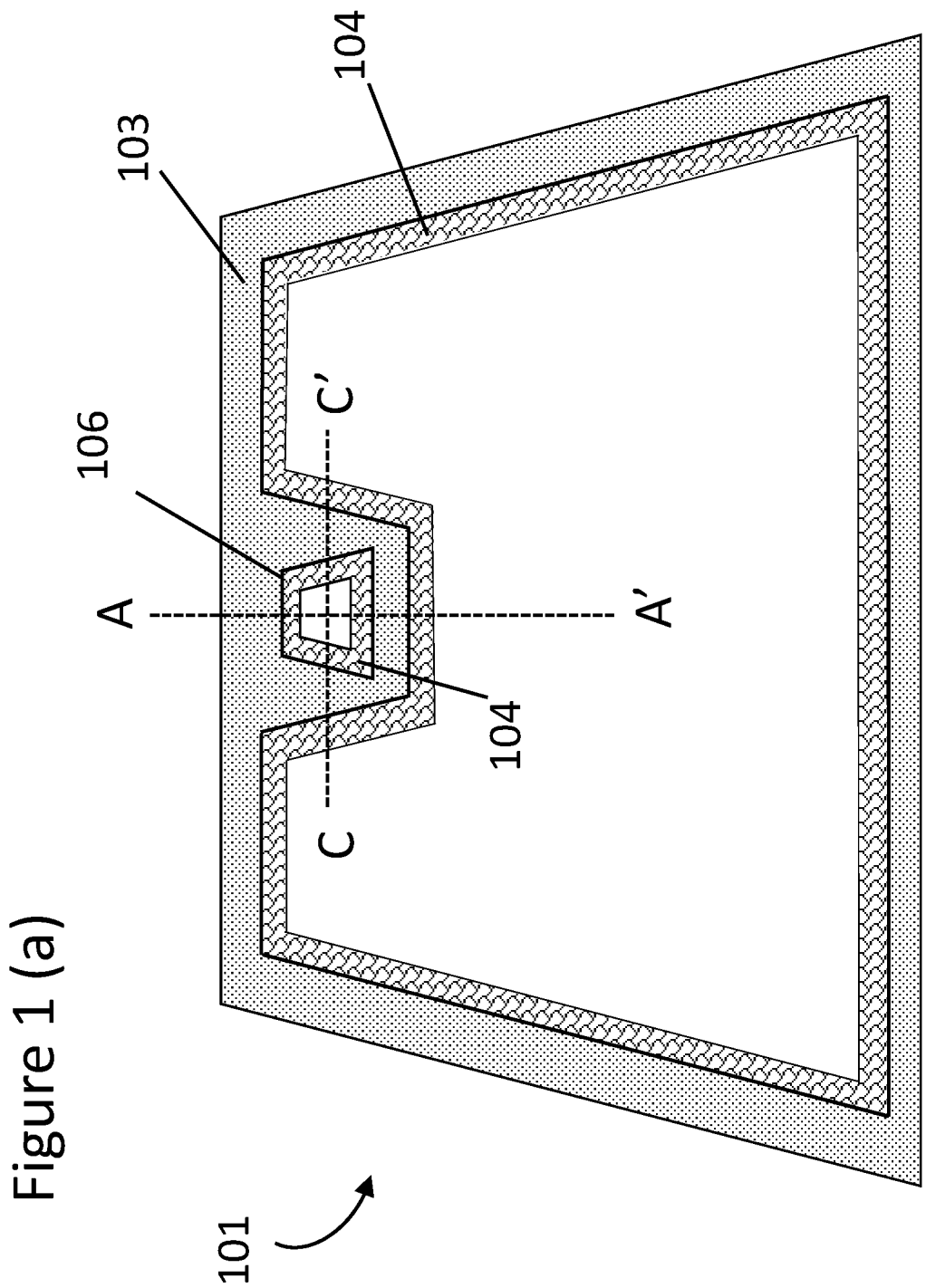
FIG. 1(a) illustrates a conventional laminated vehicle glass with an information acquisition system opening region.
FIG. 1(b) illustrates a conventional laminated vehicle glass with an information acquisition system opening region (a cross-section view along the line AA' shown in FIG. 1(a))
FIG. 1(c) illustrates a bending gap problem which may be observed in a conventional laminated vehicle glass with an information acquisition system opening region.
Figure 1:
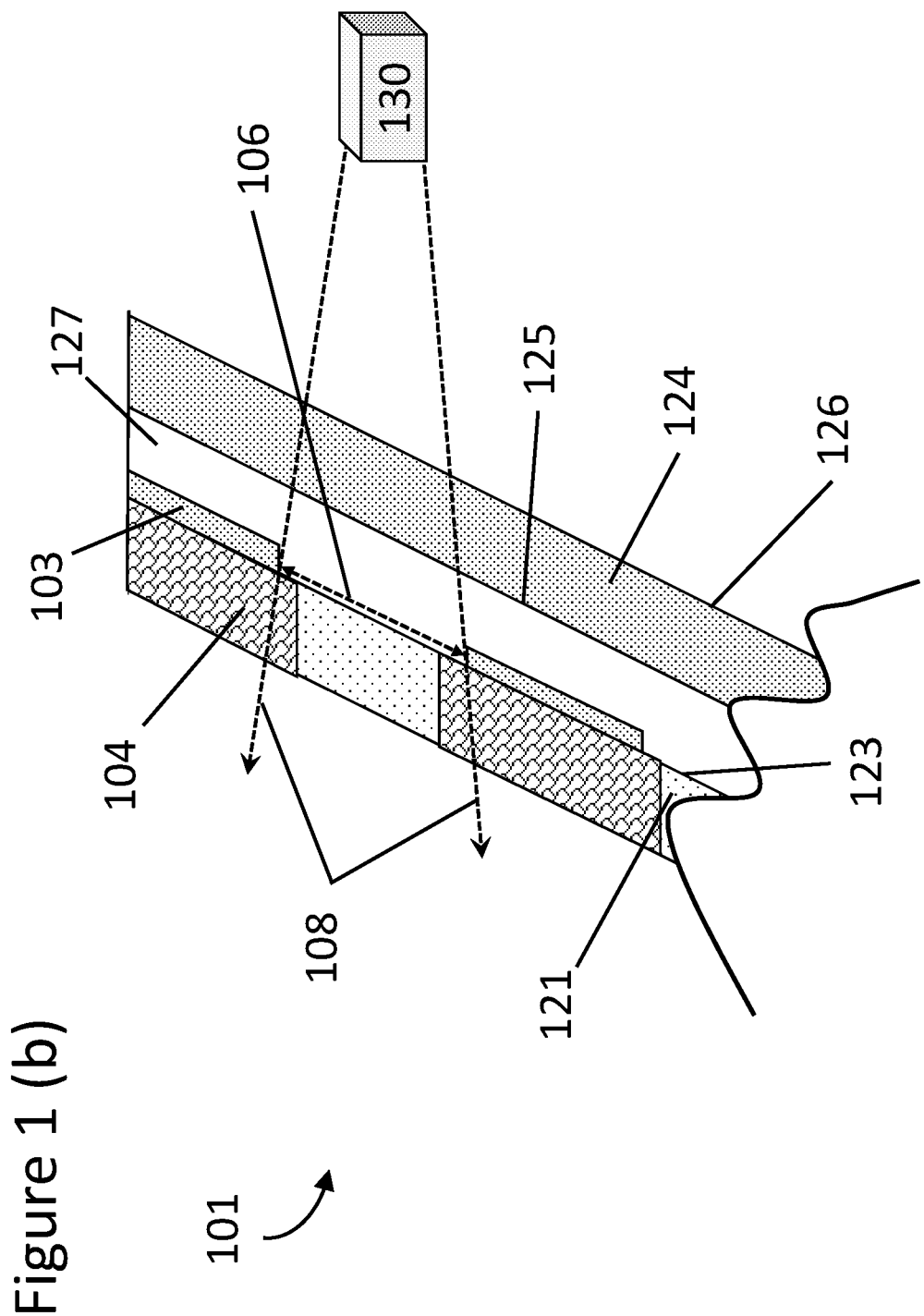
Figure 1:
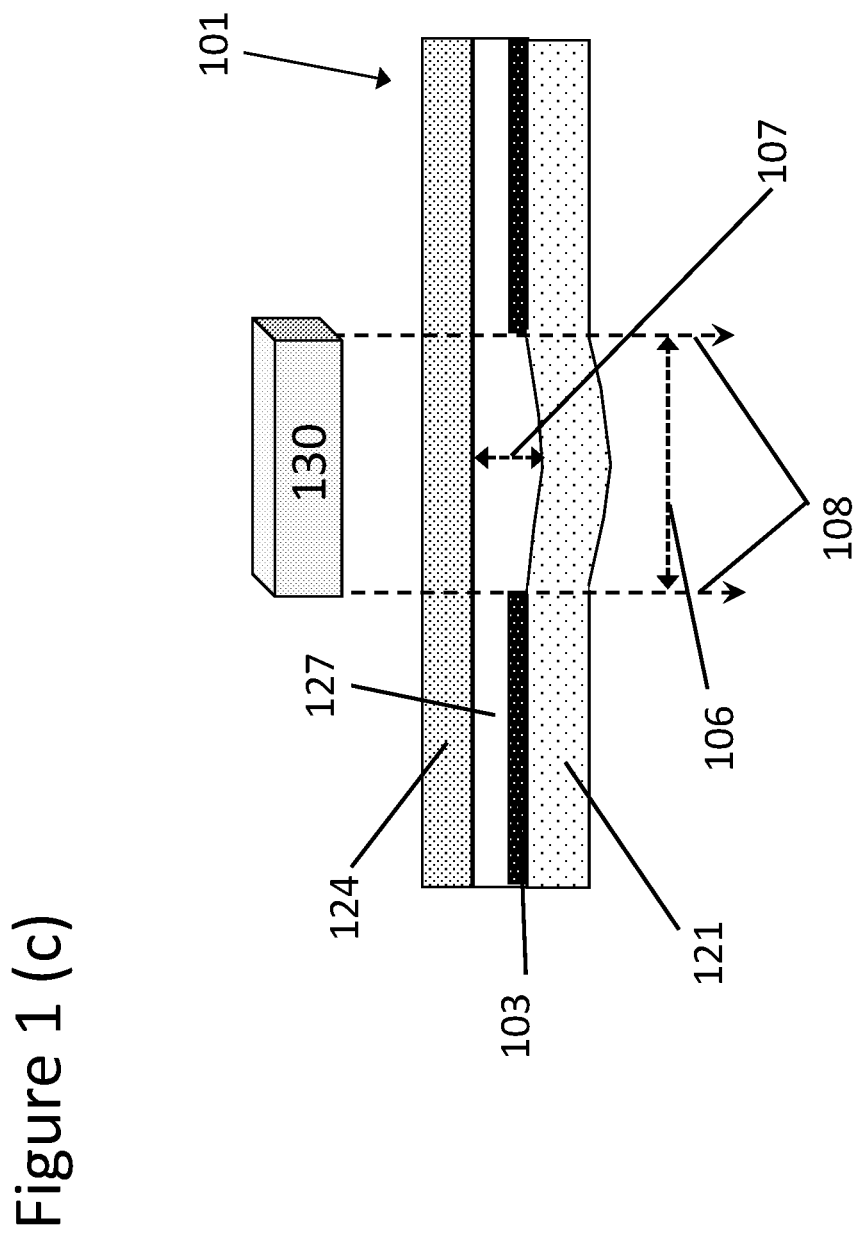

FIG. 1(a) shows a conventional laminated windshield 101 with an information acquisition system opening. Opaque enamel printing 103 may be provided in a periphery area of the windshield 101 and in a region near the information acquisition system opening, providing an opaque enamel printing open area 106. With reference to FIG. 1(b), the opaque enamel print 103 may be printed on surface S2 123 of a first glass substrate 121 or surface S4 126 of a second glass substrate 124.

There is an opaque enamel print open area 106 (e.g., open space without opaque enamel printing) in the opaque enamel printing 103 through which an information acquisition system 130 (e.g., high-resolution cameras) may observe information regarding conditions outside of the vehicle.

Optical distortions 104 in the glass substrate(s) may be observed along the opaque enamel print 103, resulting in distortion of information acquired by the information acquisition system 130. These optical distortions 104 may be created, at least in part, due to reasons described below.

In general, in preparation of a vehicle glazing, flat glass substrates 121, 124 are bent at thermal bending process temperatures (e.g., greater than 600° C. for soda-lime glass) to form a two or three-dimensional shape to fit a vehicle's window. Glass substrates may be heat treated at such high temperature and cooled to bend and/or temper the glass substrates. Opaque enamel prints 103 may be printed by, for example, screen-printing on flat glass substrates 121, 124 before thermal treatment. The screen-printed opaque enamel prints 103 are then fired in the temperature range of 500-700° C. during the thermal treatment process to form a rigid print with high mechanical durability. In such manufacturing processes, the opaque enamel printing materials, such as black enamel paint, and the glass substrate 121, 124, such as a transparent or semi-transparent soda-lime silica glass which may defined by ISO 16293-1:2008, may display different physical properties, such as light absorptance, elastic modulus or coefficient thermal expansion. For example, a black-colored opaque enamel print 103 typically absorbs much more heat in a furnace than the glass substrate 121, 124, resulting in inhomogeneous temperature distribution in the glass substrate 121, 124. Temperatures in areas of the glass substrate 121, 124 near the black-colored opaque enamel printed area 103 may be locally higher than those areas far from the printing 103. Moreover, differences may exist between the coefficients of thermal expansion (CTE) of the black-colored opaque enamel printing 103 and the soda-lime silica glass substrate 121, 124, resulting in residual stress after the glass substrate 121, 124 and opaque enamel print 103 are cooled down. For at least these reasons, the optical distortions 104 near the opaque enamel printing 103 may be created by heat treatment of the printed glass substrates 121,124. After the heat treatment, the first and second glass substrates 121, 124 may be laminated together with a polymer interlayer 127, such as polyvinyl butyral (PVB) polymer sheet, using a lamination process well known in the art (e.g., autoclaving).

FIG. 1(b) shows a cross-section view along a line AA' in the FIG. 1(a). In the information acquisition system required open area 108, the optical distortions 104 along the opaque enamel printing 103 may exist and overlap with a field of vision of the information acquisition system 130, where edge lines of the opaque enamel printing 103 define the edge of measurement fields 108 of the information acquisition system 130. The information acquisition system required open area 108 includes the area through which the information acquisition system 130 collects information. The information acquisition system required open area 108 may depend on various factors, including, but not limited to, the information acquisition system 130, the distance between a mounted information acquisition system 130 and the opaque enamel print 103, and the installation angle of a printed glazing.

As shown in FIG. 1(c) a small difference in shape of glass substrates 107 after a bending process may occur between the first glass substrate 121 and the second glass substrate 124 during the thermal bending process that may result in optical distortions 104. Such a difference may still exist after the lamination process, resulting in the presence of the small gap 107 in the laminated glazing (a bending gap). The bending gap 107 may act as a convex or concave shaped lens, depending on the physical properties of the opaque enamel printing 103 and glass substrate 121, 124 materials and thermal treatment process parameters. Such a "convex/concave lens effect" may be problematic for an information acquisition system 130 which may have strict distortion tolerances, such as those systems having high resolution cameras.

The present disclosure includes, among other features, a vehicle glazing having an opening for an information acquisition system with less optical distortion and a method of manufacturing such vehicle glazings having an opaque enamel print. Opaque enamel printing may be desirable in a glazing to provide aesthetic patterns, including dot patterns around a print edge, or for its physical properties. Particularly, a S4 printing may provide a suitable adhesion surface or acid resistance. Thus, it is desirable to provide a solution that may address the problems with opaque enamel printings.

Figure 2:
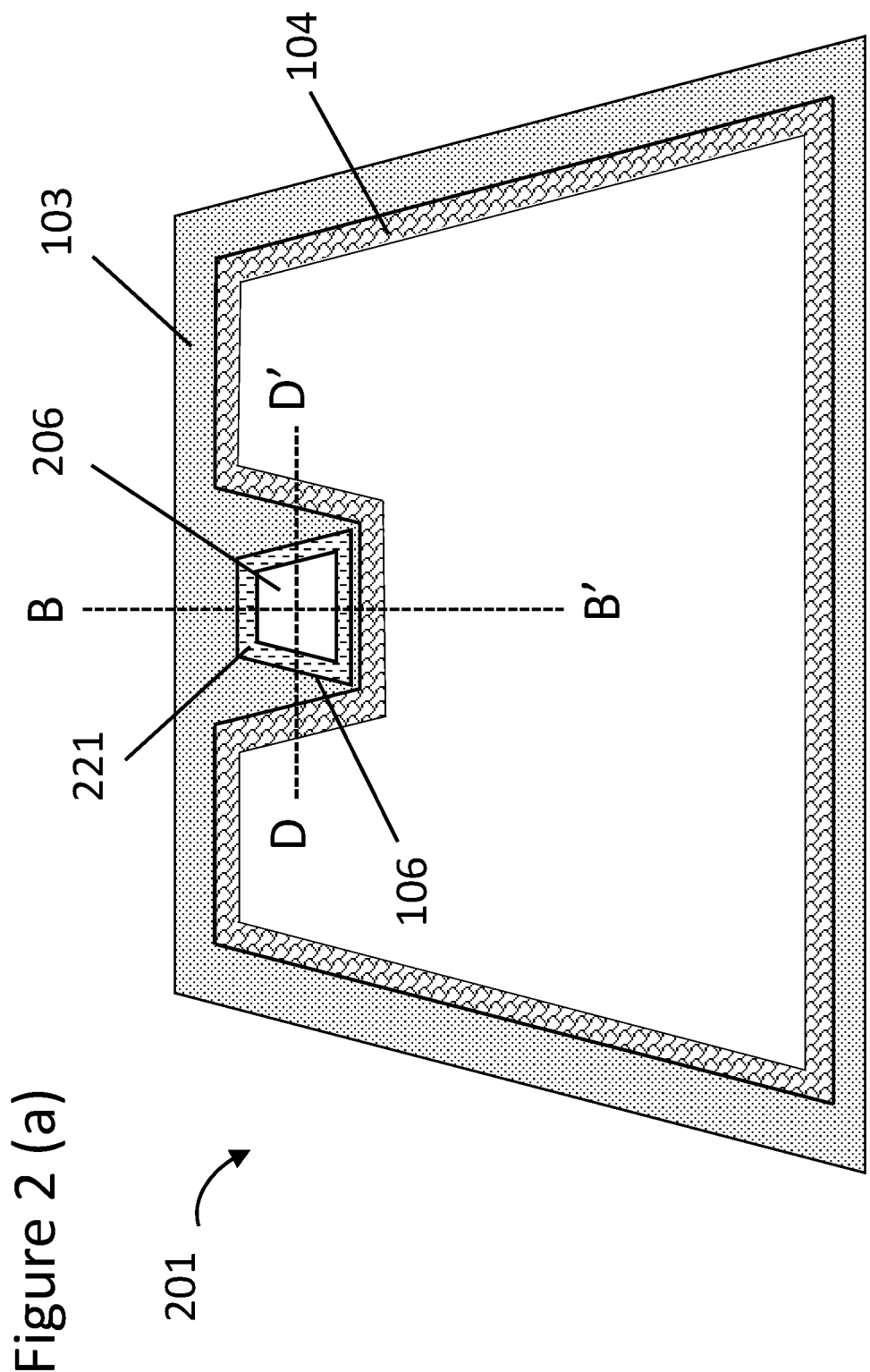
FIG. 2(a) illustrates a laminated vehicle glass with an information acquisition system opening region, having a darkening source, according to an exemplary aspect of the present disclosure.
FIG. 2(b) illustrates a laminated vehicle glass with an information acquisition system opening region, having a darkening source (a cross-section view along the line BB' shown in FIG. 2(a)), according to an exemplary aspect of the present disclosure.
FIG. 2(c) illustrates a laminated vehicle glass with an information acquisition system opening region, having a darkening source (a cross-section view along the line DD' shown in FIG. 2(a)) according to an exemplary aspect of the present disclosure, together with the conventional laminated vehicle glass (a cross-section view along the line CC' shown in FIG. 1(c) for comparison)
Figure 2:
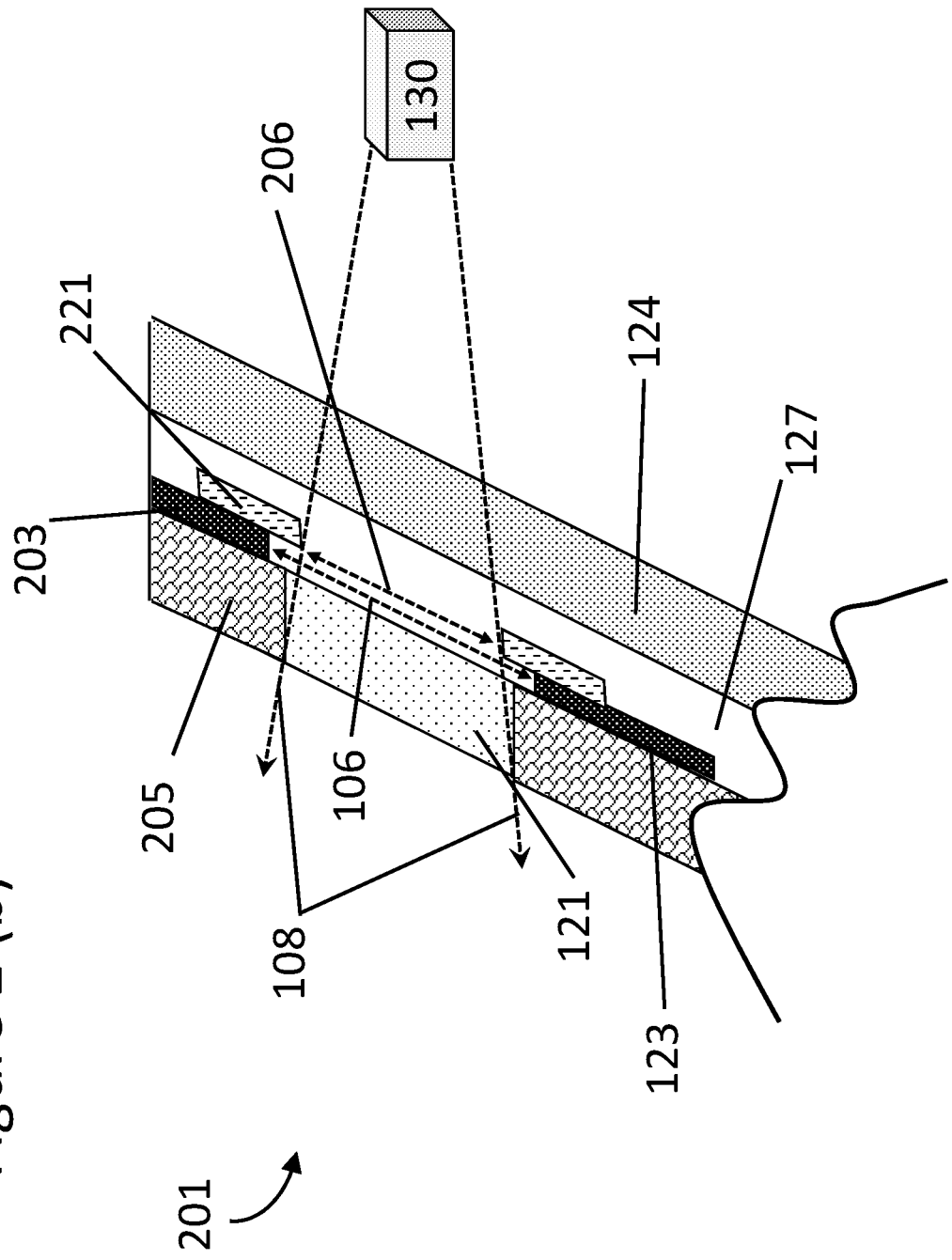
Figure 2:
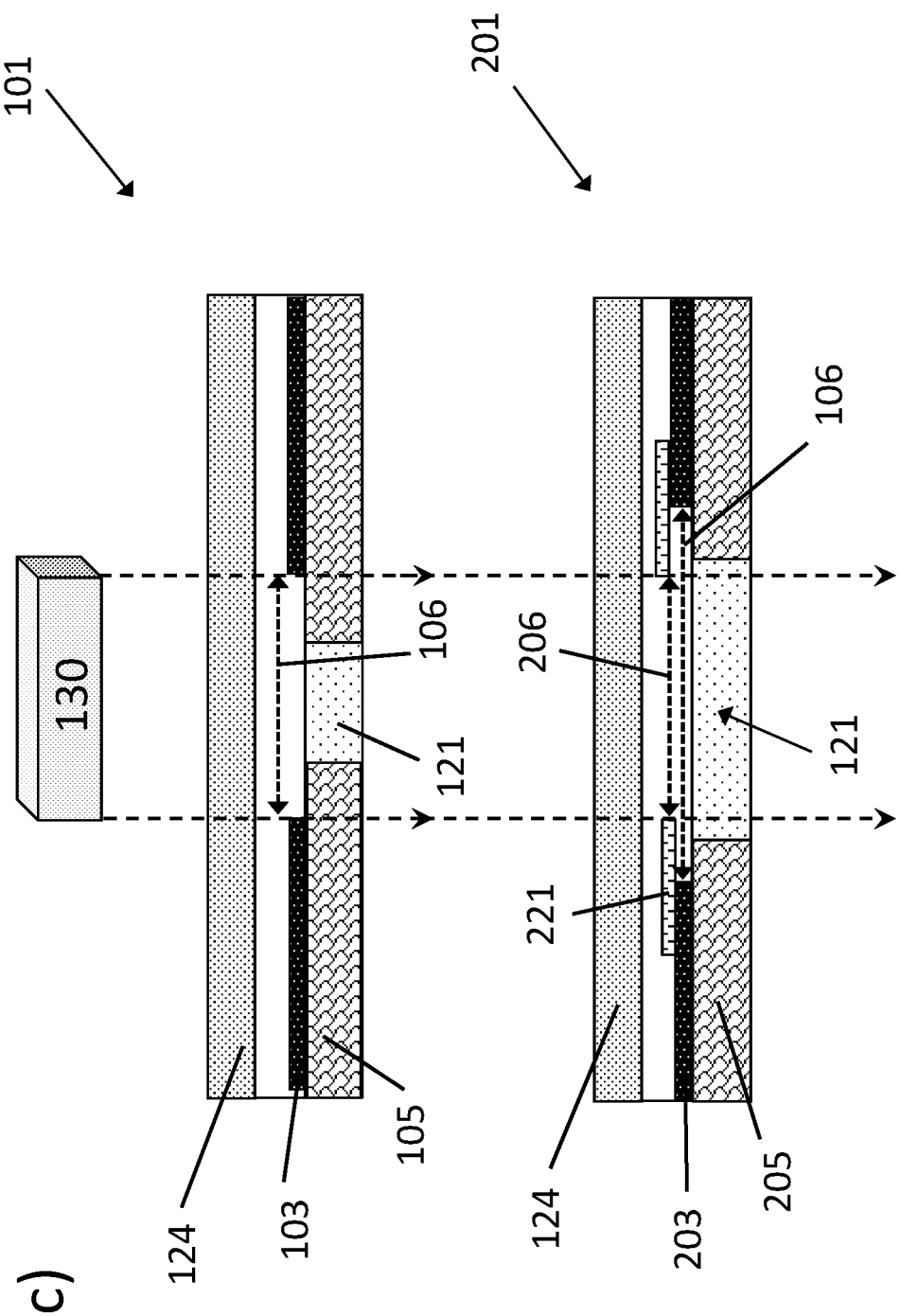

As disclosed herein, referring to FIGS. 2(a) and 2(b), a vehicle glazing 201 having an opaque enamel printed open area 106 for an information acquisition system 130 may further include a darkening source 221 within the first opaque enamel printed open area 106, wherein the darkening source 221 forms a second opening 206 within the first opening 106. The second darkening source open area 206 may preferably be smaller than the first opaque enamel printing open area 106. The darkening source 221 may be formed by various sources and may be provided in or on any portion of the glazing 201, including on any of surfaces S2, S3, and/or S4 or on or within the interlayer materials 127. The darkening source 221 may be adjacent to or separated from the opaque enamel printing 203. Where the darkening source 221 is adjacent to the opaque enamel printing 203, in some embodiments, the darkening source 221 may be in contact with the opaque enamel printing 203 and the glass substrate which the opaque enamel printing 203 is printed on. It may be preferable that the opaque enamel print 203 is from 0.003 to 0.02 mm, more preferably from 0.005 to 0.015 mm.

The opaque enamel printed opening 106 may be printed larger than the size necessary for an information acquisition system opening 108 in at least one direction, thus eliminating at least a portion of the distortion 104 formed by the opaque enamel print 203 from the required field of view 108 for the information acquisition system 130. In such a case, a darkening source 221 may be applied to or within the glazing 201 to provide a narrower, in at least one direction, information acquisition system opening 206 which may remain at least as large as a required opening 108 for the information acquisition system 130, such that the required opening 108 fits within the darkening source opening 206. The darkening source 221 may cover at least distortion 205 formed at the edge of the opaque enamel printed open area 106 during a heat treatment process. The darkening source 221 may also provide masking to cover areas within the opaque enamel printed open area 106 that would otherwise be visible from a vehicle exterior, including space between printings on S2 and S4. The opaque enamel print 203 may be provided on any of surfaces S2, S3, and S4.

Figure 3:
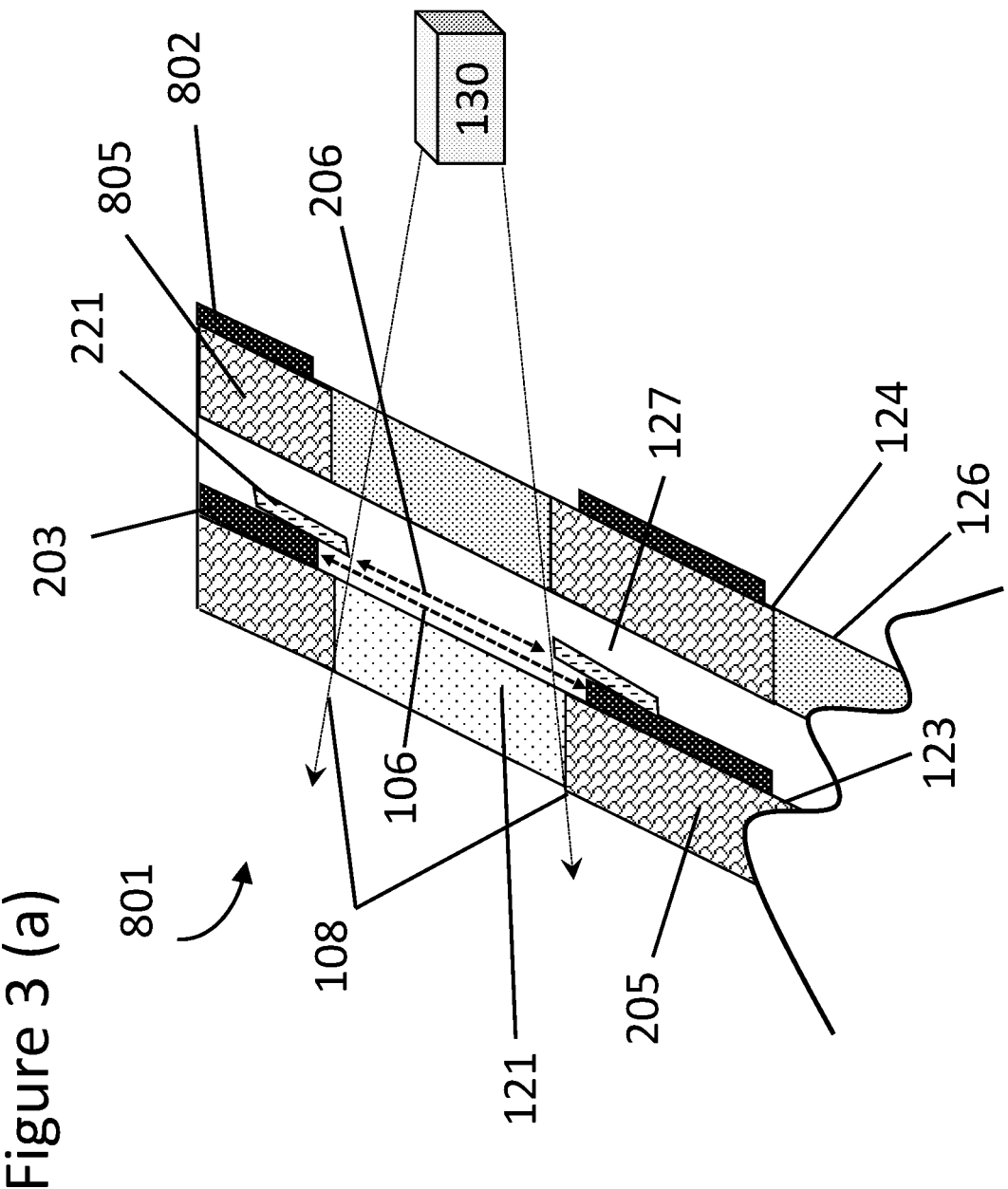
FIG. 3(a) illustrates a laminated vehicle glass with an information acquisition system opening region, having a darkening source open area and an opaque enamel printing on both S2 and S4 surfaces (a cross-section view along the line BB' shown in FIG. 2(a)), according to an exemplary aspect of the present disclosure.
FIG. 3(b) illustrates a laminated vehicle glass with an information acquisition system opening region, having a darkening source and an opaque enamel printing on both S2 and S4 surfaces (a cross-section view along the line DD' shown in FIG. 2(a)), according to an exemplary aspect of the present disclosure.
Figure 3:
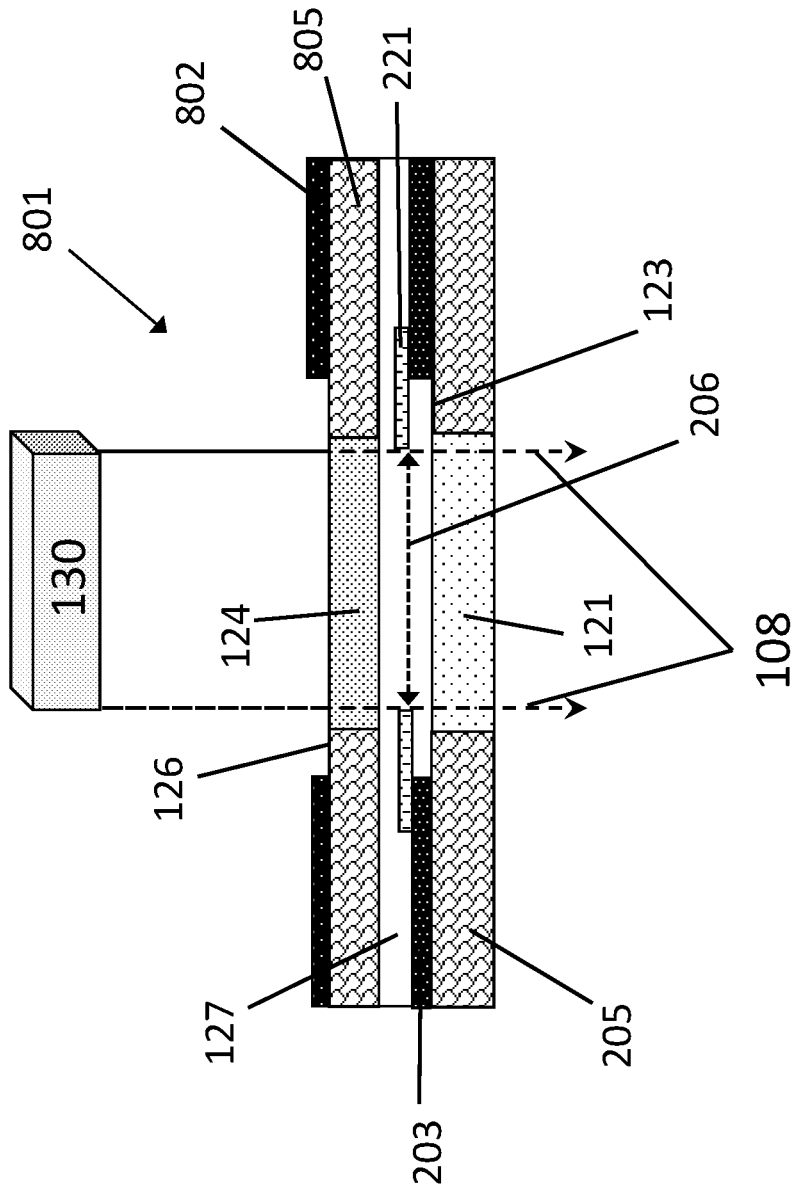

As shown in FIG. 3(a), in some embodiments, an opaque enamel printing 203, 802 may be provided on both on S2 and S4 and further, may provide the same, or substantially the same, opaque enamel printed open area 106. If the same, or substantially the same, screen print is used to print each glass substrate 121, 124 in a laminated construction, after bending and lamination, the S4 print 802 may be visible within the opaque enamel print open area on S2 106 even though both the S2 and S4 opaque enamel prints 203, 802 include an open area 106. It may be preferable to provide the same print on S2 and S4 so that during the heat treatment process, including bending, any deformations 205, 805 formed based on heating differences at the printed surface may be consistent between the glass substrates 121, 124 in a laminated glazing 801. There may be a need, however, in such cases to mask the visible S4 print 802 and the area within the information acquisition system opening 106 that it may be preferable to hide from view from the vehicle exterior. Masking of an interior space may also be preferable where there is a single print on one of S2, S3, or S4. As described herein, a darkening source 221 may be used to provide such masking.

In further embodiments, the darkening source 221 may provide protection from stray light. The information acquisition system 130 may be affected by stray light, particularly at night or where sunlight is at an angle to the glazing. The darkening source 221 may provide a darkening source open area 206 which limits exposure of the information acquisition system 130 to stray light.

The darkening source 221 may be any element that creates a darkened area blocking part of the opaque enamel printed and fired opening 106. The darkening source 221 may be any suitable material, which may include, among others, paint, ink, polymer film, polymer stickers, coatings, a mounted bracket, mounting elements, and/or mating materials between a mounted bracket and the glazing. Preferably, the darkening source 221 is applied to the glazing after the glass substrates 121, 124 are heat treated, which may include bending and/or tempering, and an opaque enamel print 203, 802 is fired on the glass 121, 124. The glazing construction having a darkening source 221 may include laminated glass substrates 121, 124 or a single glass substrate.

Figure 4:
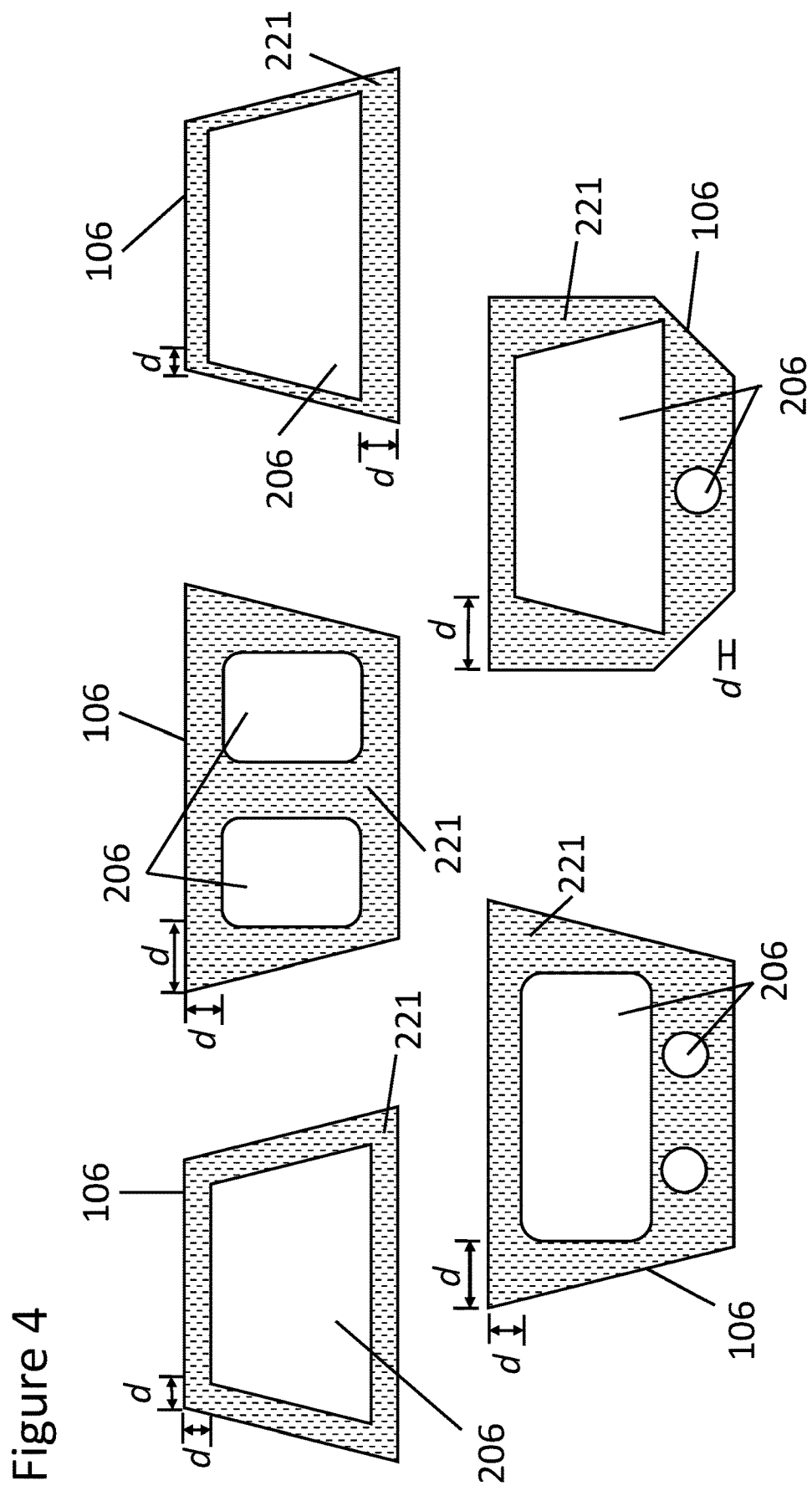
FIGS. 4-6 illustrate opaque enamel printed open areas having a darkening source and at least one darkening source open area, according to exemplary aspects of the present disclosure.

The darkening source 221 may be any suitable size. The darkening source 221 may be sized to mask glass deformities 205, 805, protect against stray light, and/or provide cover for the vehicle interior around the information acquisition system field of view 108. The information acquisition system field of view 108 corresponds to the size of an opening required for the information acquisition system 108, such that the information acquisition system may effectively collect information from a vehicle exterior. In some embodiments, the darkening source 221 may overlap with an opaque enamel printing 203, 802 by at least 1 mm, wherein the edge of a darkening source 221 may preferably be behind an opaque enamel printing 203, 802 as viewed from a vehicle exterior. The darkening source 221 may extend from the edge of the opaque enamel printing 203, 802 into an opaque enamel printing opening 106 any suitable distanced. Preferably, the distance d, as illustrated in FIG. 4, between the edge of the darkening source open area 206 and the edge of the opaque enamel printing open area 106 is from 0 to 22 mm, more preferably from 0 to 10 mm, and more preferably from 0 to 6 mm. More preferably, the distance d between at least one edge of the darkening source open area 206 and at least one edge of the opaque enamel printing open area 106 is from 2 to 22 mm, more preferably from 2 to 10 mm, and more preferably from 2 to 6 mm.

Figure 5:
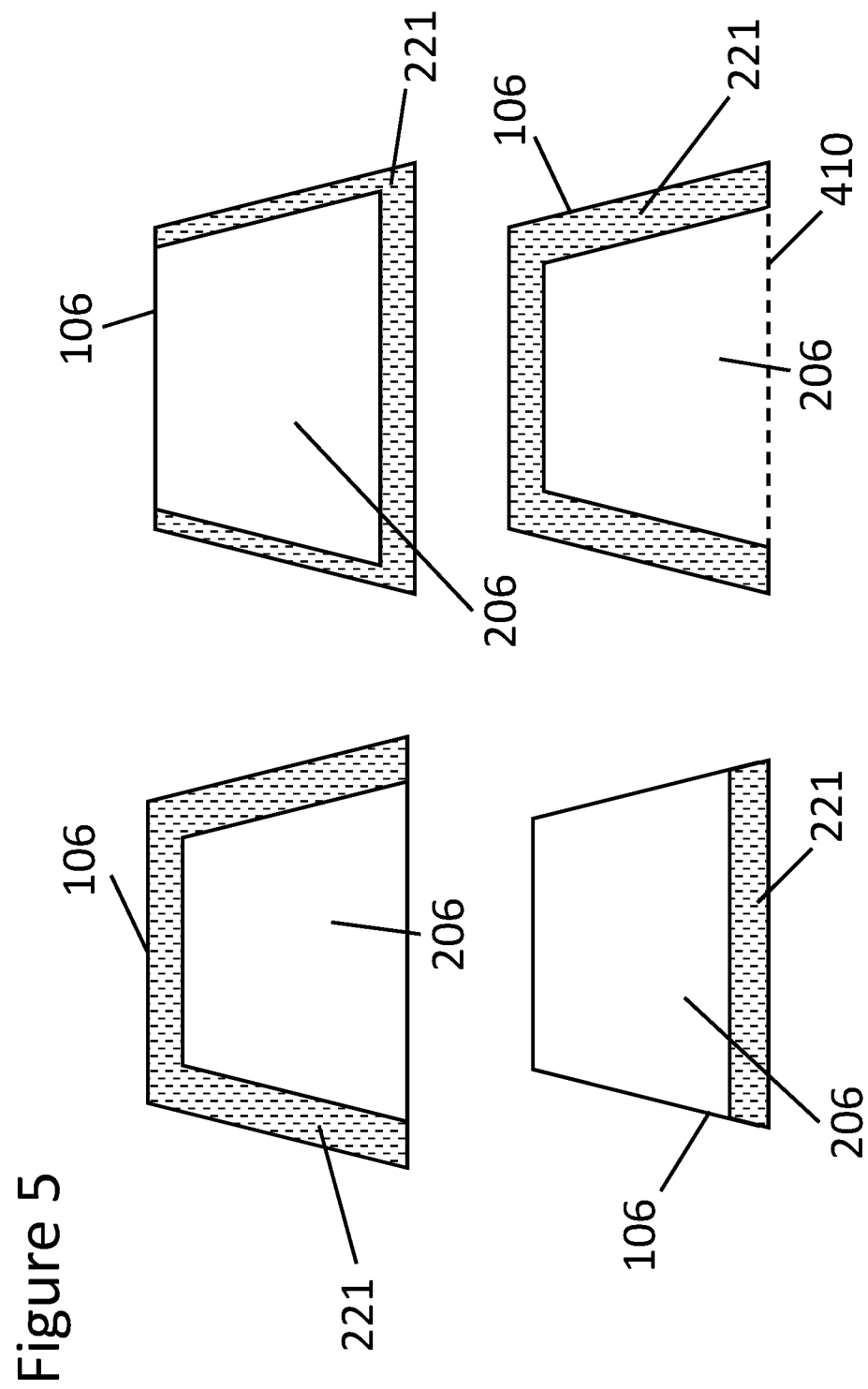

Preferably, the darkening source 221 provides a darkening source open area 206 at least as large as the required opening 108 for the information acquisition system. More preferably, the darkening source opening 206 is larger than the information acquisition system required opening size 108 by at most 3 mm, such that the entire information acquisition system required opening 108 is within the darkening source opening 206 and the opaque enamel printed opening 106 at the darkening source 221. The difference in size between an opaque enamel printed opening 106 and a darkening source opening 206 may be described by the average visible light transmission of each opening. For example, the darkening source opening 206 may preferably have an average visible light transmittance of at least 70% or more and the average visible light transmittance of the opaque enamel printed opening 106 may be less than 70%. Preferably, the average visible light transmittance of the opaque enamel printed opening may be equal to or less than 67%, or, more preferably, equal to or less than 65%. As illustrated in FIG. 5, the average visible light transmittance of the opaque enamel printed opening 106 is preferably smaller than the average visible light transmittance of the darkening source opening 206 as the darkening source 221 is at least partially located within the opaque enamel printed opening 106, lowering the average visible light transmittance across the entire opaque enamel printed opening 106. The average visible light transmittance of the opaque enamel printed opening 106 is therefore a function of the visible light transmittance of the darkening source opening 206 and the darkening source 221. The darkening source 221 preferably has a visible light transmittance of less than or equal to 10%, more preferably less than or equal to 6% and more preferably equal to or less than 3%.

The darkening source 221 may or may not surround the darkening source open space 206 so as to enclose the darkening source open space 206 within the darkening source 221. As shown in FIG. 5, where the darkening source 221 does not completely surround a darkening source opening 206, the darkening source opening 206 border may be partially the same as an opaque enamel printed opening 106 border. For example, where the opaque enamel printed opening 106 has a four-sided trapezoidal shape, the darkening source 221 may be a rectangular shape along an edge of the trapezoidal shape. As shown in FIG. 5, a trapezoidal-shaped opaque enamel printing open area 106 may overlap with a darkening source 221 such that the opaque enamel printing open area 106 and the darkening source open area 206 have at least one edge shared by both openings 106, 206. Thus, the darkening source open area 206 may be bordered by the darkening source 221 on less than every edge of the darkening source open area 206. In some embodiments, the darkening source 221 may extend along any number of edges of an opaque enamel printed opening, including one, two, three, or more edges. Further, in certain embodiments, the opaque enamel printing 203 may not surround the opaque enamel open area 106. In such cases, the opaque enamel open area 106 may be defined having an unprinted border 410. The opaque enamel open area 106, may not extend into a driver viewing area, even where the opaque enamel open area 106 is not surrounded by the opaque enamel print 203.

As shown in FIG. 4, in some embodiments, the darkening source 221 may be visible from a vehicle exterior within each opaque enamel printed opening 106 edge, such that the darkening source open area 206 is enclosed by the darkening source 221. However, the distance d between the opaque enamel printed opening 106 and the darkening source opening 206 may or may not be consistent around the perimeter of the openings 106, 206. Further, the opaque enamel printed opening 106 and the darkening source opening 206 may or may not be the same shape, as shown in FIG. 4.

Figure 6:
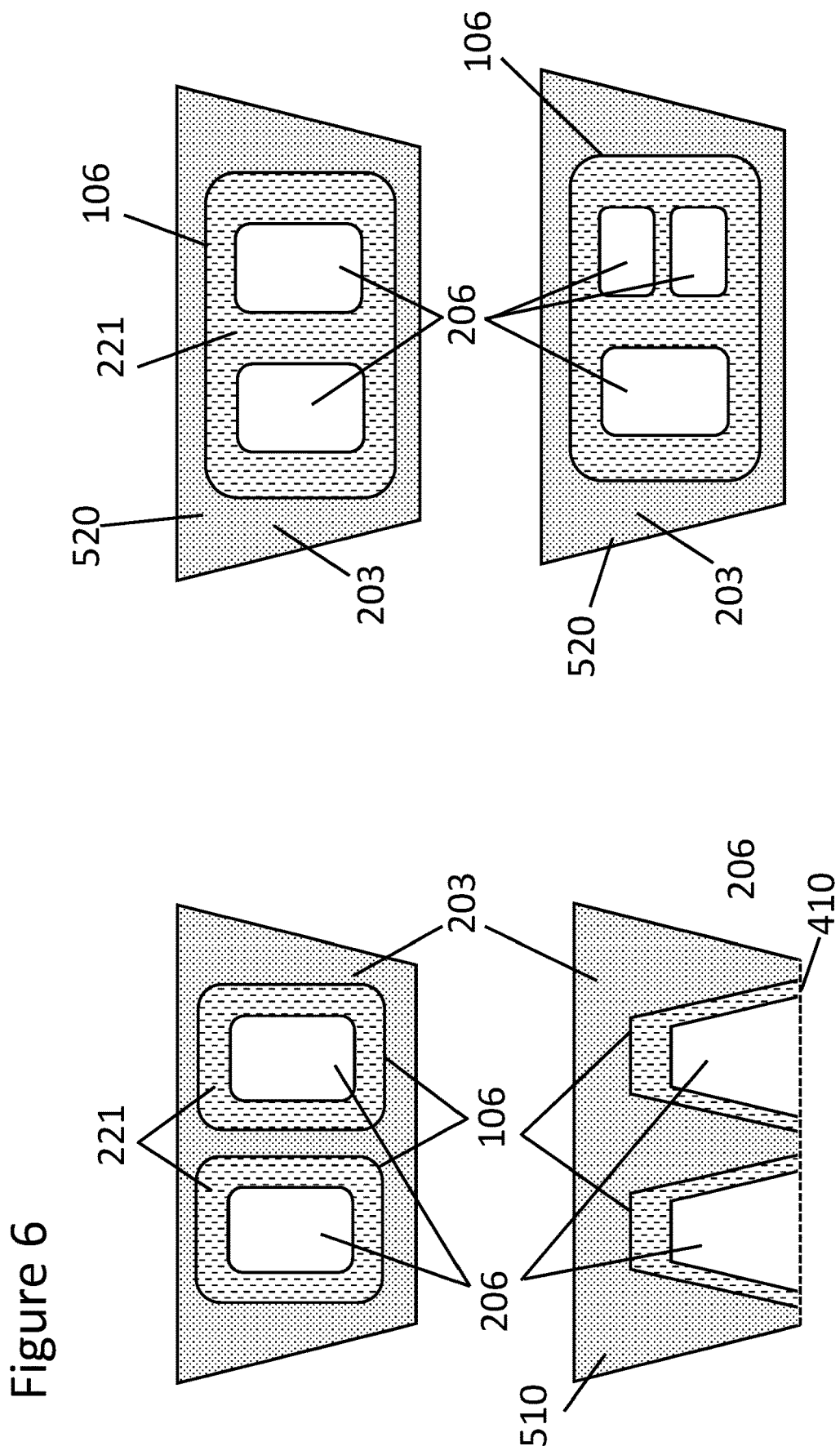

In some embodiments, the glazing may include more than one information acquisition system opening. As shown in FIG. 6, an opaque enamel printing 510 may be used to outline each information acquisition system opening 106 and at least one darkening source 221 may be used to provide a darkening source open area 206 within each opaque enamel printing open area 106. A single darkening source 221 may be used in some embodiments to provide a darkening source opening 206 for more than one opaque enamel printed opening 106, where other embodiments may utilize at least one darkening source 221 for each opaque enamel printed opening 106. In some embodiments, having any number of information acquisition system openings, there may be more than one darkening source 221 utilized in an individual information acquisition system opening. Further embodiments may include more than one darkening source open area 206 which may or may not be the same size and shape.

In certain embodiments, an opaque enamel printing 520 may provide a single opening 106 to include more than one darkening source opening 206. A darkening source 221 may be used to provide separation between darkening source openings 206 within the large opaque enamel printed opening 106. Where more than one information acquisition system 130 is provided, the systems may be used separately or together in a single system, such as in stereo cameras. Further, the information acquisition systems may be the same or different types of systems, for example, the systems may include a camera and a non-optical sensor.

In certain embodiments, the darkening source 221 may include a darkening print that is not heat treated above 500° C. The darkening print may be applied to any glass or interlayer surface by any suitable means, including screen printing. The darkening print may be any suitable material, including dark or black colored inks or paints or carbon nanotube arrangements. Where a glass substrate is printed with the darkening print, the darkening print may be applied after the glass substrate is heat treated, such that the darkening print does not undergo the heat treatment. For example, without limitation, darkened colored organic inks having firing temperatures 100-300° C., suitable for screen printing, can be used, such as the inks available from Teikoku Printing Ink or Seiko Advanced Ltd. In a laminated glazing, the darkening print may be applied to any glass surface, including S2, S3, and/or S4. In further embodiments, the interlayer may be printed with the darkening print. In these and further embodiments, the darkening source may have an edge which may be a straight or patterned edge.

Where the darkening source 221 is provided as an interlayer, it may be desirable to provide the darkening interlayer as a "patch" in a full glazing interlayer. In such embodiments, a portion of an interlayer to be laminated in a glazing at the opaque enamel print open area 106 may be removed and replaced with the darkening interlayer patch. Such a patch may include colored or printed interlayer material to provide the darkening source 221 located at least within the opaque enamel printed opening 106. To provide a clear interlayer in the darkening source opening 206, a separate patch may be required within the darkening interlayer patch. It may be appreciated that a full glazing interlayer may be printed in a targeted area to provide a printed interlayer and a darkening source opening 206 in a laminated glazing. In some embodiments, the darkening source 221 may be a colored interlayer which may be colored by a dye, pigments or other means during production of the interlayer. The colored or printed interlayer may further be a thin construction that may be laminated onto the non-darkening polymer interlayer without requiring a patch. A patch may be preferable where the colored or printed interlayer is thicker than 0.2 mm.

The darkening source 221 may further be a substrate having a dark or black color that is adjacent to a glass surface and/or an interlayer in a glazing. The substrate may be any suitable material, including polymer films such as polyethylene terephthalate (PET) or polyvinyl chloride (PVC). A darkening source substrate may be printed or colored and may optionally include an adhesive layer, such as a sticker. The darkening source substrate may include a carbon nanotube layer to provide a black darkening source. In some embodiments, the darkening substrate may be provided adjacent to at least one glass surface which may be at least one of surfaces S2, S3, and S4. In certain embodiments, the darkening substrate may include an electrical component. For example, the darkening substrate may include a darkened polymer film which is a backing for an electrical heating element, which may be applied to surface S4 to provide heating to the information acquisition system opening. As shown in FIG. 2(b), the darkening substrate 221 may be placed between a first glass substrate 121 and an interlayer 127. Alternatively, the darkening substrate 221 may be placed between the second glass substrate 124 and the interlayer 127. In some embodiments, the darkening substrate 221 may be placed between at least two interlayer materials within a laminated glazing 201. Preferably, the darkening source 221 does not increase the distance between glass substrates 121, 124 in a laminated glazing 201 by more than 0.2 mm. More preferably, the distance between glass substrates 121, 124 in a laminated glazing 201 is not increased by more than 0.1 mm, more preferably less than 0.05 mm.

In some embodiments, the darkening source 221 may include a coating. Particularly, a colored coating may be applied at least partially in the opaque enamel printed open area 106 to provide a darkening source open area 206. The coating may be applied to any glass surface, including at least one of S2, S3, and S4. More than one colored coating may be used in a glazing to provide the darkening source 221 at a desired opacity. Where multiple coatings are used, the coatings may be formed on the same or different glass surfaces. In certain embodiments, the coatings may be the same or different colors that combine to provide a darkening source 221 and define the darkening source open area 206.

Further, the darkening source 221 may include an obscuration that is not formed with the laminated glazing. The obscuration may be applied to the glazing and may include devices used to mount the information acquisition system 130 or other accessories attached to the glazing. For example, a camera bracket may be mounted against the S4 surface and provide a darkening source 221 within the opaque enamel printed opening 106. The obscuration may further be formed from devices used for mounting or mating of a bracket or other mechanism to the laminated glazing. It may be appreciated that the darkening source 221, when not formed as part of the glazing, may include any material adjacent to, and in contact with, the S4 surface which provides a darkened area within an opaque enamel printed opening 106 to provide a darkening source opening 206.

It may be appreciated that a non-laminated glass substrate may be provided with an opaque enamel printed open area 106 and a darkening source 221 providing a darkening source open area 206 within the opaque enamel printed open area 106 as described herein with respect to a laminated glazing. Further, it may be appreciated that the glazings disclosed herein may provide any suitable vehicle glazing, including windshields, rear windows, side windows, pillars, or other glazings.

FIG. 2(a) shows an exemplary embodiment of a laminated vehicle glass 201 with an information acquisition system opening to provide improved transmittance optics for an information acquisition system. FIG. 2(b) shows a cross-section view along the line BB' shown in FIG. 2(a).

First glass substrate 121 and second glass substrate 124 may be heat treated (bent) to fit a vehicle window design. The glass substrates 121, 124 may include soda-lime glass manufactured by a float method, which may be clear, green, or tinted glass, preferably having a thickness of between 0.40 to 3.0 mm. Optionally, a functional coating such as infrared ray reflecting (IRR) coating comprising functional metallic silver layers may be deposited on at least one of the S2 123 and S3 125 surfaces. A polymer interlayer 127, such as PVB or polyethylene terephthalate (PET) interlayer, optionally with an improved acoustic insulation function (acoustic PVB) and/or a wedged angle function (wedged PVB) may be used in the laminated glazing 201. For example, without limitation, a clear-colored first soda-lime glass substrate 121 with a thickness of about 1.8 mm may be used, and a tinted-colored second soda-lime glass substrate 124 with a thickness of about 1.8 mm may be used where a functional IRR coating may be deposited on the S3 125 surface.

An opaque enamel printing 203 may be provided on the S2 123 surface of the first glass substrate 121 or the S4 surface 126 of the second glass substrate 124, in a periphery area of the laminated vehicle glass 201 near the information acquisition system, wherein the opaque enamel printing 203 provides an opaque enamel printing opening 106. The opaque enamel printing 203 may provide a relatively wider opened area 106 than the information acquisition system opening required 108 by the information acquisition system 130 (e.g., high-resolution cameras and/or sensors) to observe information outside of the vehicle. Colored enamel printing materials (such as black ceramics) known in the art for a vehicle's window may be used to create the opaque enamel printing 203. As illustrated in FIG. 2(a) and FIG. 2(b), a darkening source 221 may be inserted between the first and second glass substrates 121, 124 to mask the information acquisition system 130 from view when outside of the vehicle and may further define edge lines of a vision field of the information acquisition system 130. The darkening source 221 may include any darkening material such as those discussed herein, including an opaque polymer sticker. The thickness of the opaque polymer sticker is preferably selected from the range of 0.01 to 0.2 mm. Other thickness ranges may be preferable depending on the other constituent elements of the laminated structure. The darkening source 221 is preferably the same color as the opaque enamel printing 203. For example, a black colored PVC thin film with a thickness of about 0.06 mm may be used.

In the exemplary embodiment shown in FIG. 2(c), the opaque enamel printing open area 106 may have a relatively wider open area than required by an information acquisition system 130. Thus, the optical distortion 205 created along the wider open area 106 may have little or no overlap with the required information acquisition system open area 108. A darkening source 221 may be used to provide a darkening source open area 206 within the wider open area 106, such that the darkening source open area 206 may include less optical distortion 205 than the wider opaque enamel printing open area 106. Preferably, the optical distortion 205 within the darkening source open area 206 may be no greater than 150 mdpt, more preferably no greater than 100 mdpt, or more preferably no greater than 60 mdpt. As such, the information acquisition system 130 may obtain clear images or visions without optical distortion associated with conventional constructions. The darkening source 221, rather than the opaque enamel printing 203, may define the edge of the information acquisition system opening while masking the information acquisition system 130 from view from outside of the vehicle. In some embodiments, the information acquisition system opening may be defined by both the opaque enamel printing 203 and the darkening source 221, such as where the darkening source 221 does not surround the darkening source open area 206, as illustrated in FIG. 5.

FIG. 4 shows example embodiments of the darkening source 221. As described above, since the darkening source 221 may define the region of information acquisition system open area, the designs may be flexible and customizable depending on function and/or the number of cameras/sensors in the information acquisition system 130 or systems. The darkening source 221 may provide a single opening or multiple openings having the same or different geometric shapes.

Figure 7:
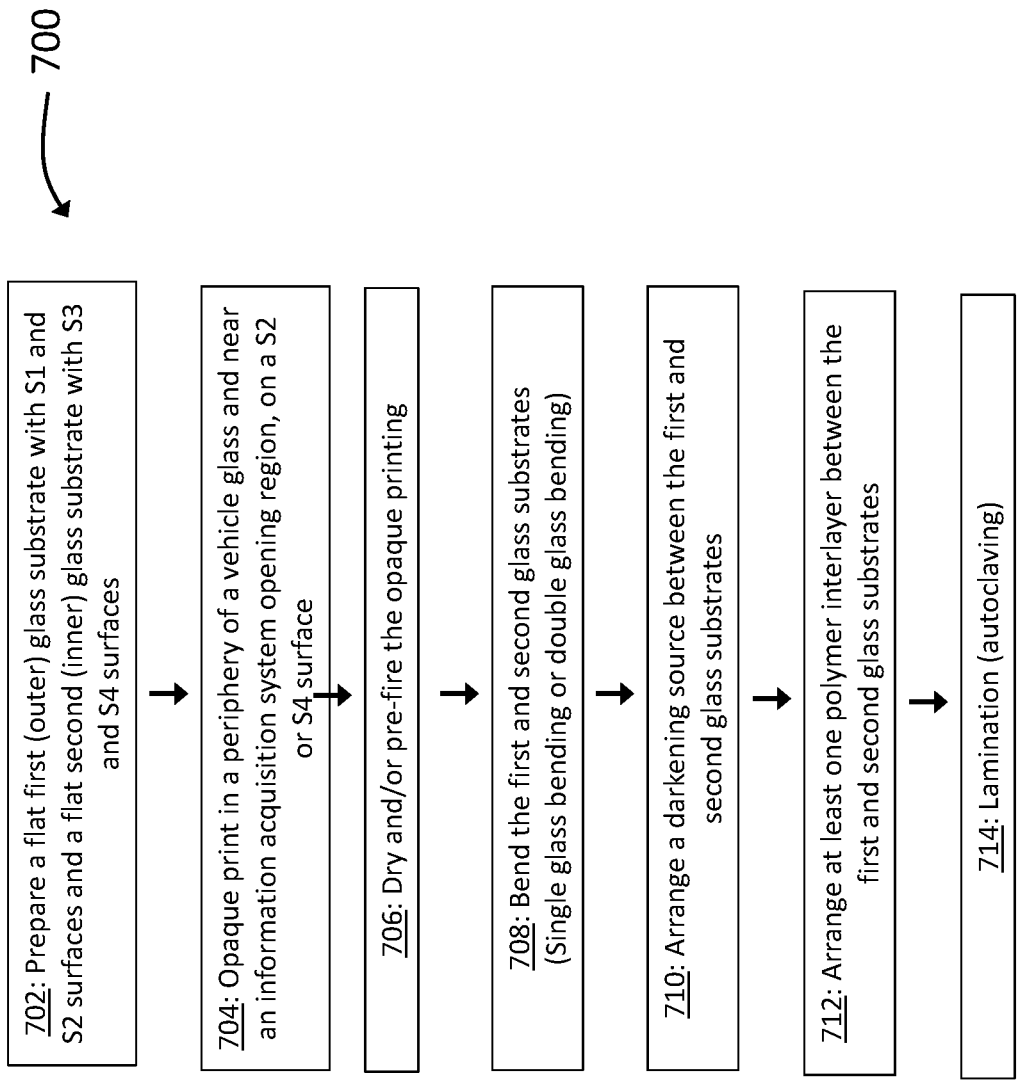
FIG. 7 illustrates an example manufacturing process of a laminated vehicle glazing having a darkening source, according to an exemplary aspect of the present disclosure.

Referring to FIG. 7, a process 700 for manufacturing a laminated vehicle glass with at least one information acquisition system opening may comprise the following steps.

Step 702 may include preparing a flat first (outer) glass substrate with S1 and S2 surfaces and a flat second (inner) glass substrate with S3 and S4 surfaces (e.g., cutting, grinding and washing). Optionally, a functional coating, such as an IRR coating, may be deposited by physical vapor deposition (PVD), chemical vapor deposition (CVD) or atomic layer deposition (ALD) on at least one of the S2 or S3 surfaces.

Step 704 may include providing an opaque enamel printing in a periphery of the laminated vehicle glass and near an information acquisition system opening, on the S2 or S4 surface. Known opaque enamel printing materials (such as black ceramic paint) and printing methods (such as screen printing) may be used. The open area without opaque enamel printing in the region near the information acquisition system may be pre-defined in such a way that the open area may be larger than a required open area for the information acquisition system.

Step 706 may include drying and/or pre-firing the opaque enamel printing. Known drying and/or pre-firing methods (such as infrared drying) may be used.

Step 708 may include bending of the first and second glass substrates. Any known gravity-sag bending (double glass bending) and/or press bending (single glass bending) method may be used.

Step 710 may include arranging at least one darkening source between the first and second bent glass substrates. The darkening source may be pre-defined to provide a desired shape, for example, as shown in FIG. 4. The darkening source may be arranged onto the S2 and/or S3 surface. It may be preferable to arrange the darkening source on S2.

Step 712 may include arranging at least one polymer interlayer, such as a PVB sheet, between the first and second glass substrates.

Step 714 includes a conventional lamination process (e.g., autoclaving).

In additional embodiments, the darkening source may be applied to an outer glass surface, including S4. The darkening source may further be provided between two interlayers laminated between the glass substrates.

Figure 8:
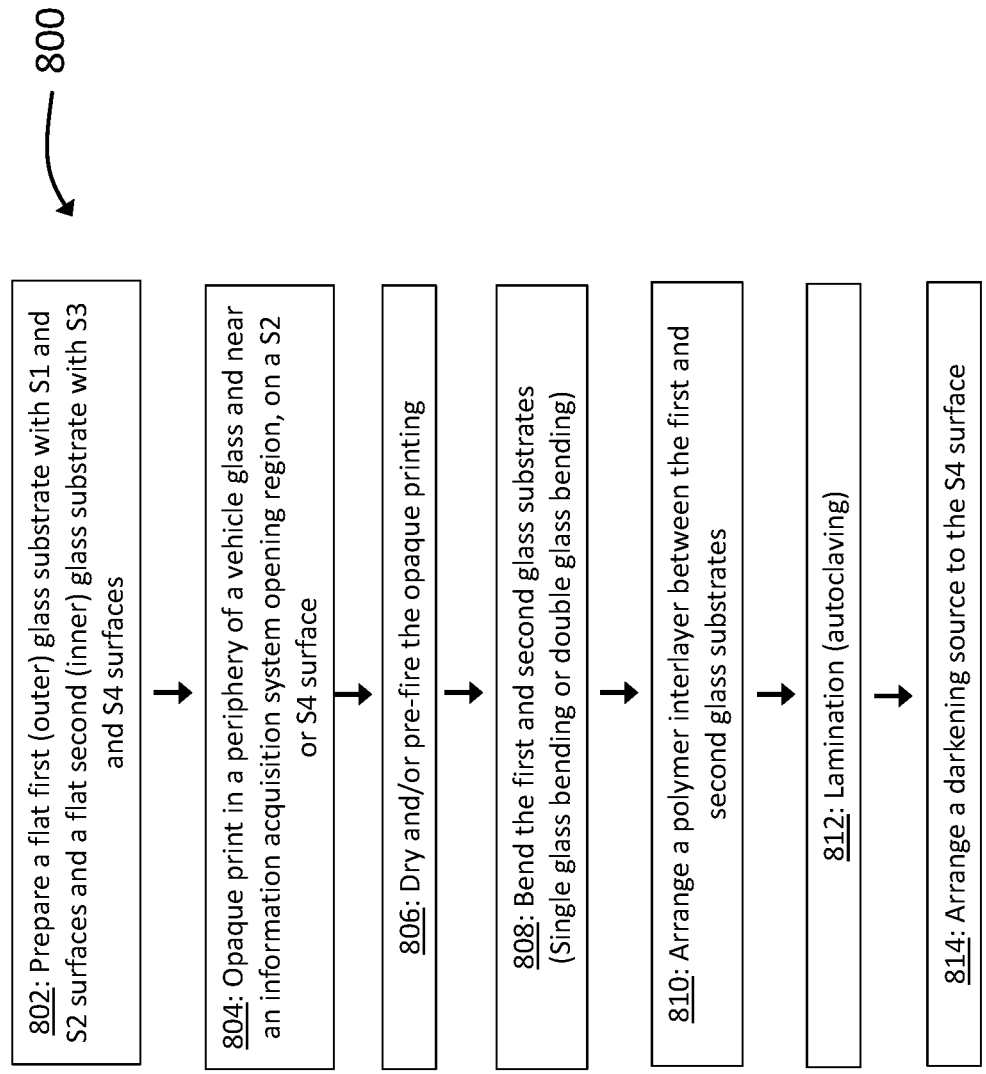
FIG. 8 illustrates another manufacturing process of a laminated vehicle glazing having a darkening source, according to an exemplary aspect of the present disclosure.

Referring to FIG. 8, a process 800 for manufacturing a laminated vehicle glass with at least one information acquisition system opening may include the following steps.

Step 802 may include preparing a flat first (outer) glass substrate with S1 and S2 surfaces and a flat second (inner) glass substrate with S3 and S4 surfaces (e.g., cutting, grinding and washing). Optionally, a functional coating, such as an IRR coating, may be deposited by physical vapor deposition (PVD), chemical vapor deposition (CVD) or atomic layer deposition (ALD) on at least one of the S2 and S3 surfaces.

Step 804 may include providing an opaque enamel printing in a periphery of the laminated vehicle glass and near an information acquisition system opening, on the S2 or S4 surface. Known opaque enamel printing materials (such as black ceramic paint) and printing methods (such as screen printing) may be used. The open area without opaque enamel printing in the region near the information acquisition system opening may be pre-defined such that area may be larger than a required open area for the information acquisition system.

Step 806 may include drying and/or pre-firing the opaque enamel printing. Known drying and/or pre-firing methods (such as infrared drying) may be used.

Step 808 may include bending of the first and second glass substrates. Any known gravity-sag bending (double glass bending) and/or press bending (single glass bending) method may be used.

Step 810 may include arranging at least one polymer interlayer, such as PVB sheet, between the first and second glass substrates.

Step 812 may include a conventional lamination process (e.g., autoclaving).

Step 814 may include arranging a darkening source onto the S4 surface of the second glass substrate. The darkening source may be pre-defined to provide a desired shape, for example, as shown in FIG. 4.

FIG. 3(a) shows another exemplary embodiment of a laminated vehicle glazing 801 with an information acquisition system opening to provide improved transmittance optics for an information acquisition system (a cross-section view is shown in the same manner as FIG. 2(a) and FIG. 2(b)).

In addition to the features discussed with reference to FIGS. 2(a), 2(b) and 2(c), an opaque enamel printing region 802 having an open area may be provided on the S4 surface, in addition to the opaque enamel printing opening 106 on the S2 123 surface of a first glass substrate 121. According to the embodiment illustrated, the printing pattern or design of the opaque enamel printing 802 on surface S4 126 of the second glass substrate 124 may be substantially the same as that of the opaque enamel printing 203 on surface S2 123 to minimize the bending gap effect and further improve optical distortion 205, 805, as each glass substrate 121, 124 may provide the same or substantially the same heating distortions 205, 805 formed during the heat treatment process. In some embodiments, heat treatment may include thermally tempering and/or bending the glass substrate(s) 121, 124. The darkening source 221 may define the edge and size of the darkening source open area 206 through which an information acquisition system 130 may collect information from outside the vehicle window. The darkening source 221 may further mask areas within the opaque enamel printing open areas 106 that may be desirable to mask from the view from a vehicle exterior. The darkening source open area 206 is preferably at least as large as the required opening 108 for the information acquisition system 130.

Figure 9:
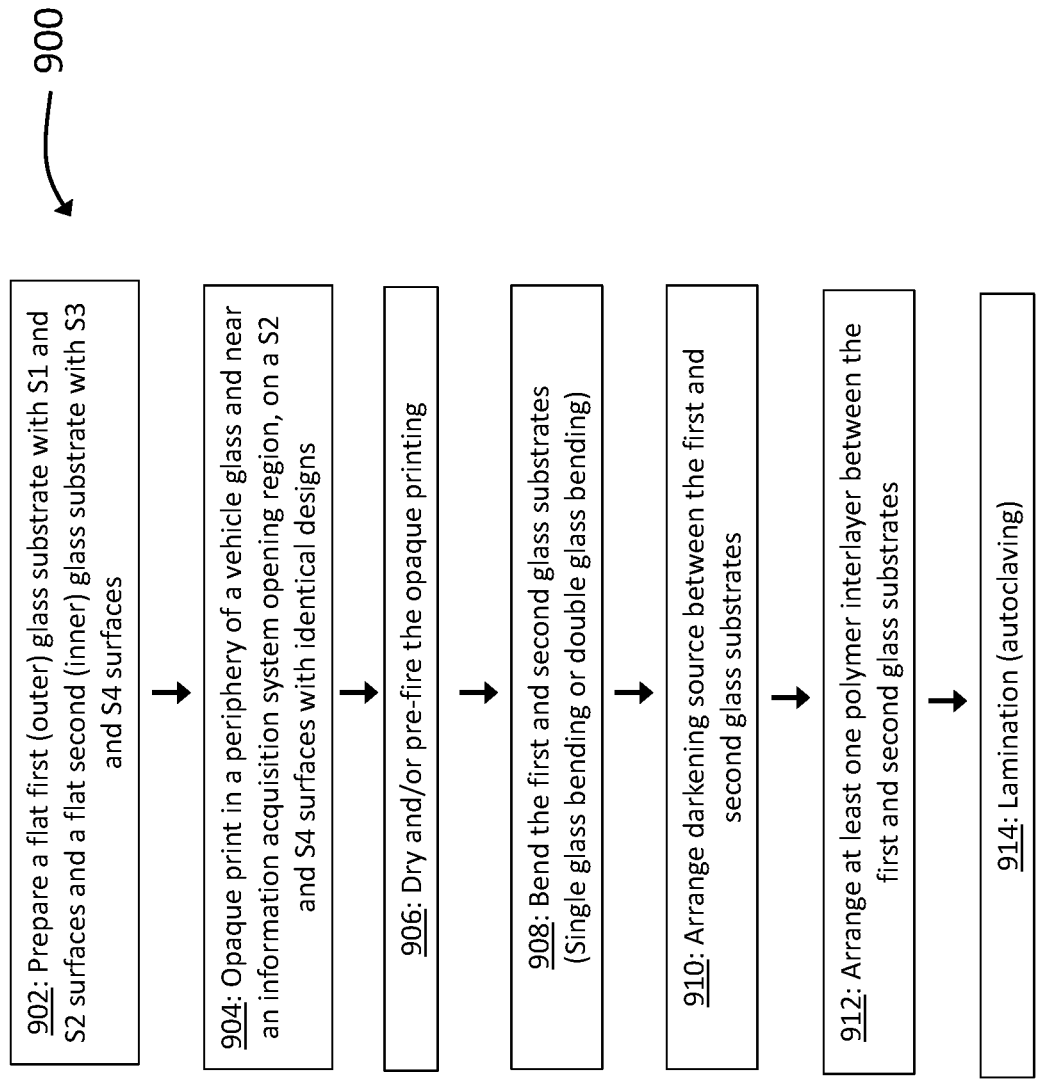
FIG. 9 illustrates a manufacturing process of a laminated vehicle glazing having a darkening source, according to an exemplary aspect of the present disclosure.

According another aspect of the present disclosure, referring to FIG. 9, a process 900 for manufacturing a laminated vehicle glass with at least one information acquisition system opening may comprise the following steps.

Step 902 may include preparing a flat first (outer) glass substrate with S1 and S2 surfaces and a flat second (inner) glass substrate with S3 and S4 surfaces (e.g., cutting, grinding and washing). Optionally, a functional coating, such as an IRR coating, may be deposited by physical vapor deposition (PVD), chemical vapor deposition (CVD) or atomic layer deposition (ALD) on at least one of the S2 and S3 surfaces.

Step 904 may include providing an opaque enamel printing in a periphery of the laminated vehicle glass and near an information acquisition system opening, on the S2 and S4 surfaces. Known opaque enamel printing materials (such as black ceramic paint) and printing methods (such as screen printing) may be used. The open area without opaque enamel printing in the region near the information acquisition system opening may be pre-defined in such a way that the area may be larger than a required open area for the information acquisition system. The opaque enamel printings on the S2 and S4 surfaces may optionally be the same or substantially the same.

Step 906 may include drying and/or pre-firing the opaque enamel printing. Known drying and/or pre-firing methods (such as infrared drying) may be used.

Step 908 may include bending of the first and second glass substrates. Any known gravity-sag bending (double glass bending) and/or press bending (single glass bending) method may be used.

Step 910 may include arranging at least one darkening source between the first and second bent glass substrates. The darkening source may be pre-defined to provide a desired shape, for example, as shown in FIG. 4. In some embodiments, the darkening source may be placed on surface S2 and/or S3.

Step 912 may include arranging a polymer interlayer, such as PVB sheet, between the first and second glass substrates.

Step 914 includes a conventional lamination process (e.g., autoclaving).

In additional embodiments, the darkening source may be applied to an outer glass surface, including S4. The darkening source may further be provided between two interlayers laminated between the glass substrates.

According to yet another aspect of the present disclosure, referring to FIG. 10, another manufacturing process 1000 of a laminated vehicle glass with at least one information acquisition system opening may comprise the following steps.

Step 1002 may include preparing a flat first (outer) glass substrate with S1 and S2 surfaces and a flat second (inner) glass substrate with S3 and S4 surfaces (e.g., cutting, grinding and washing). Optionally, a functional coating, such as an IRR coating, may be deposited by physical vapor deposition (PVD), chemical vapor deposition (CVD) or atomic layer deposition (ALD) on the S2 or S3 surface.

Step 1004 may include providing an opaque enamel printing in a periphery of the laminated vehicle glass and near an information acquisition system opening, on the S2 and S4 surfaces. Known opaque enamel printing materials (such as black ceramic paint) and printing methods (such as screen printing) may be used. The open area without opaque enamel printing in the region near the information acquisition system opening may be pre-defined such that the area may be larger than a required area for the information acquisition system. In some embodiments, the opaque enamel printings on the S2 and S4 surfaces may optionally have the same or substantially the same designs.

Step 1006 may include drying and/or pre-firing the opaque enamel printing. Known drying and/or pre-firing methods (such as infrared drying) may be used.

Step 1008 may include bending of the first and second glass substrates. Any known gravity-sag bending (double glass bending) and/or press bending (single glass bending) method may be used.

Step 1010 may include arranging at least one polymer interlayer, such as a PVB sheet, between the first and second glass substrates.

Step 1012 may include a conventional lamination process (e.g., autoclaving).

Step 1014 may include arranging a darkening source onto the S4 surface of the second glass substrate. The darkening source may be pre-defined to provide a desired shape, for example, as shown in FIG. 4.

The above description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. For example, the description above may apply to a laminated glazing a well as a single glass substrate.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. An automotive glazing, comprising:
   at least one glass substrate;
   an opaque print on the at least one glass substrate, wherein the opaque print provides a first open area for an information acquisition system, wherein the first open area is larger than a required opening for the information acquisition system, and wherein the automotive glazing comprises a first distortion within the first open area; and
   a second open area within the first open area, wherein the second open area is at least as large as the required opening for the information acquisition system, and wherein the automotive glazing comprises a second distortion within the second open area, such that the second distortion is less than the first distortion.

2. An automotive laminated glazing, comprising:
   a first glass substrate having at least surfaces S1 and S2, wherein S1 faces a vehicle exterior;
   a second glass substrate having at least surfaces S3 and S4, wherein S4 faces a vehicle interior;
   a first interlayer between the first and second glass substrates;
   an opaque print providing a first open area for a first information acquisition system, wherein the first open area is larger than a first required opening for the first information acquisition system; and
   a first darkening source at least partially within the first open area, wherein the first darkening source provides a second open area within the first open area, wherein the first required opening fits within the second open area, wherein the first darkening source does not undergo heat treatment greater than 500 deg. C., and wherein the first open area is larger than the second open area in square mm.

3. The automotive laminated glazing according to claim 2, wherein the average visible light transmittance across the entire first open area is less than 70% and the average visible light transmittance across the entire second open area is at least 70%.

4. The automotive laminated glazing according to claim 2, wherein the first darkening source has a visible light transmittance of less than or equal to 3%.

5. The automotive laminated glazing according to claim 2, wherein the first darkening source is at least one selected from the group consisting of a print, a substrate, a coating, a colored interlayer and an obscuration adjacent to S4.

6. The automotive laminated glazing according to claim 5, wherein the print is on at least one selected from the surfaces S2, S3 and S4 and the first interlayer.

7. The automotive laminated glazing according to claim 5, wherein the substrate comprises at least one printed surface.

8. The automotive laminated glazing according to claim 5, wherein the substrate is a polymer film.

9. The automotive laminated glazing according to claim 8, wherein the polymer film is adjacent to at least one surface selected from S2, S3, and S4.

10. The automotive laminated glazing according to claim 8, wherein the polymer film includes an electrical component.

11. The automotive laminated glazing according to claim 5, wherein a portion of the first interlayer is removed and replaced with the colored interlayer.

12. The automotive laminated glazing according to claim 5, wherein the obscuration is a mounting device for attaching an object to the automotive laminated glazing or a mating device located between the automotive laminated glazing and another object.

13. The automotive laminated glazing according to claim 2, wherein the first darkening source completely surrounds the second open area.

14. The automotive laminated glazing according to claim 2, wherein the first darkening source does not surround the entire second open area.

15. The automotive laminated glazing according to claim 2, further comprising
a second information acquisition system, wherein the second information acquisition system has a second required opening, wherein the opaque print further comprises a third open area, separate from the first open area, such that the third open area is larger than the second required opening of the second information acquisition system; and
a second darkening source, wherein the second darkening source is located at least partially within the third open area, wherein the second darkening source provides a fourth open area within the third open area, wherein the second required opening fits within the fourth open area.

16. The automotive laminated glazing according to claim 2, further comprising a second information acquisition system having a second required opening,
wherein the first darkening source further provides a third open area within the first open area, wherein the second required opening fits within the third open area.

17. The automotive laminated glazing according to claim 2, wherein an edge of the first open area is from 2 mm to 6 mm from an edge of the second open area.

18. An automotive glazing, comprising:
a glass substrate having surfaces S1 and S2, wherein S1 faces a vehicle exterior;
an opaque print providing a first open area for an information acquisition system, wherein the first open area is larger than a required opening for the information acquisition system; and
a darkening source at least partially within the first open area, wherein the darkening source provides a second open area within the first open area, wherein the required opening for the information acquisition system fits within the second open area.

19. The automotive glazing according to claim 18, wherein the average visible light transmittance across the entire first open area is less than 70% and the average visible light transmittance across the entire second open area is at least 70%.

20. The automotive glazing according to claim 18, wherein the second open area is closer to the information acquisition system than the first open area, and wherein the first open area is larger than the second open area in square mm.

* * * * *